United States Patent Office.

CYRUS S. MOORE, OF ERIE, PENNSYLVANIA.

Letters Patent No. 97,262, dated November 23, 1869.

IMPROVED LUBRICATING-COMPOUND.

The Schedule referred to in these Letters Patent and making part of the same.

*To all whom it may concern:*

Be it known that I, CYRUS S. MOORE, of Erie, in the county of Erie, and State of Pennsylvania, have invented a new and improved Manufacture or Composition of Matter; and I do hereby declare the following to be a full and exact description of the same, and of the manner in which I compound the same, and of the offices which the several ingredients perform.

The nature of my invention consists in making a lubricating-oil from the residuum, or tar, left after refining petroleum, by combining it with other ingredients, of such a nature as to produce, when in composition, a new and useful article of manufacture.

The manner in which I produce my said new composition of matter is as follows, to wit:

I first take ten barrels of the residuum left after refining crude petroleum. To this I add one barrel of benzole, or any of the lighter products of petroleum, or the crude petroleum itself; this is added to reduce the residuum, or tar, to a more fluid consistency. I then bring the mixture to a boiling-heat, for the purpose of insuring a more perfect chemical action. While at said boiling-heat, I add to the mixture three gallons of alkali, or any alkaline substance of sufficient strength to cleanse and purify the same. I then immediately add three pounds of saltpetre, five pounds of rock-salt, and fifteen pounds of sulphur. These ingredients, especially the sulphur, serve to make the lubricant less liable to heat when in use on the journals, &c., of machinery. I also add one gallon of ammonia, the object of which is to keep the oil from congealing when reduced to a low temperature.

What I claim as my invention, and desire to secure by Letters Patent of the United States, is as follows, to wit:

1. The mode, herein described, of producing a lubricating-oil from the residuum left after refining petroleum.

2. The composition of matter, herein described, as a new article of manufacture.

CYRUS S. MOORE.

Witnesses:
    JNO. K. HALLOCK,
    C. TODD PERLEY.